United States Patent
Fronius et al.

(10) Patent No.: US 10,286,510 B2
(45) Date of Patent: May 14, 2019

(54) TOOL CLAMPING SYSTEM

(71) Applicant: BILZ WERKZEUGFABRIK GMBH & CO. KG, Ostfildern (DE)

(72) Inventors: Juergen Fronius, Walheim (DE); Rudolf Bader, Esslingen (DE); Ulrich Zierer, Reutlingen (DE)

(73) Assignee: BILZ WERKZEUGFABRIK GMBH & CO. KG, Ostfildern (DE)

( * ) Notice: Subject to any disclaimer, the term of this patent is extended or adjusted under 35 U.S.C. 154(b) by 0 days.

(21) Appl. No.: 15/874,079

(22) Filed: Jan. 18, 2018

(65) Prior Publication Data
US 2018/0141179 A1 May 24, 2018

Related U.S. Application Data

(60) Division of application No. 14/958,192, filed on Dec. 3, 2015, now abandoned, which is a continuation of (Continued)

(30) Foreign Application Priority Data
Jun. 6, 2013 (DE) .................. 10 2013 105 831

(51) Int. Cl.
*B23Q 1/00* (2006.01)
*B23B 31/02* (2006.01)
(Continued)

(52) U.S. Cl.
CPC .............. *B23Q 5/043* (2013.01); *B23B 31/02* (2013.01); *B23Q 1/0009* (2013.01); *B24B 33/08* (2013.01);
(Continued)

(58) Field of Classification Search
CPC ...... B23B 31/02; B23Q 1/0009; B23Q 5/043; H02K 35/00; Y10T 279/21
See application file for complete search history.

(56) References Cited

U.S. PATENT DOCUMENTS 2,553,251 A * 5/1951 Gutterman .............. H01L 41/12
310/26
3,151,284 A * 9/1964 Kleesattel ............. B06B 1/0261
310/26
(Continued)

FOREIGN PATENT DOCUMENTS

DE 10 2004 051 145 A1 4/2006
DE 100 13 612 B4 9/2006
(Continued)

OTHER PUBLICATIONS

German language International Search Report for PCT/EP2014/057874; 5 pp.
(Continued)

*Primary Examiner* — Eric A Gates
(74) *Attorney, Agent, or Firm* — Harness, Dickey & Pierce, P.L.C.

(57) ABSTRACT

Disclosed is a tool system including a drive for driving a tool holder including an electromagnetic generator for generating electrical energy from inertial energy of the tool holder. The tool holder may be driven in rotation, wherein the electromagnetic generator comprises a rotor part, which is rotatably mounted on the tool holder, and a stator part on the tool holder cooperating with each other for generating a voltage by electromagnetic induction. Alternatively, an axially movable inertial mass can be used for utilization of an oscillating linear movement.

14 Claims, 4 Drawing Sheets

Related U.S. Application Data application No. PCT/EP2014/057874, filed on Apr. 17, 2014.

(51) Int. Cl.
*B23Q 5/04* (2006.01)
*H02K 35/00* (2006.01)
*B24B 33/08* (2006.01)
B23B 31/117 (2006.01)
B24B 33/10 (2006.01)

(52) U.S. Cl.
CPC .......... *H02K 35/00* (2013.01); *B23B 31/1179* (2013.01); *B23B 2260/10* (2013.01); *B23B 2260/128* (2013.01); *B23B 2270/022* (2013.01); *B24B 33/10* (2013.01); *B24B 33/105* (2013.01); *Y10T 279/21* (2015.01)

(56) References Cited

U.S. PATENT DOCUMENTS

| | | | |
|---|---|---|---|
| 4,890,306 A | 12/1989 | Noda | |
| 5,525,842 A | 6/1996 | Leininger | |
| 5,564,872 A | 10/1996 | Veil | |
| 5,876,043 A | 3/1999 | Watzke | |
| 6,297,747 B1 | 10/2001 | Magori | |
| 7,498,934 B2 | 3/2009 | Tusel | |
| 9,149,899 B2 | 10/2015 | Fronius | |
| 2004/0194600 A1 | 10/2004 | Wu et al. | |
| 2009/0234490 A1 | 9/2009 | Suprock et al. | |
| 2010/0262308 A1 | 10/2010 | Anderson et al. | |
| 2013/0322889 A1 | 12/2013 | Graf | |
| 2014/0054090 A1* | 2/2014 | Schicker | E21B 4/10 175/95 |

FOREIGN PATENT DOCUMENTS

| | | |
|---|---|---|
| DE | 10 2008 009 340 A1 | 8/2009 |
| DE | 10 2009 008 227 A1 | 8/2010 |
| DE | 10 2009 045 002 A1 | 3/2011 |
| DE | 10 2011 051 772 A1 | 1/2012 |

OTHER PUBLICATIONS

German language Written Opinion of the International Searching Authority for PCT/EP2014/057874; 5 pp.

* cited by examiner

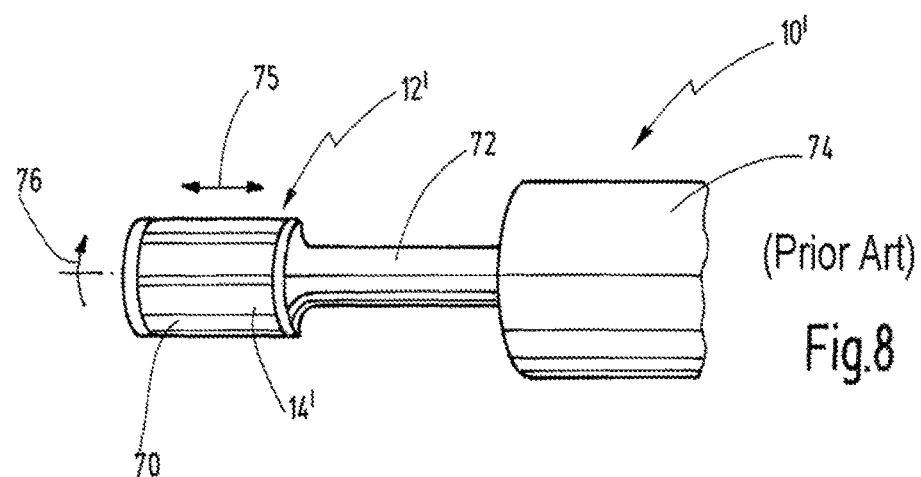
Fig.8 (Prior Art)
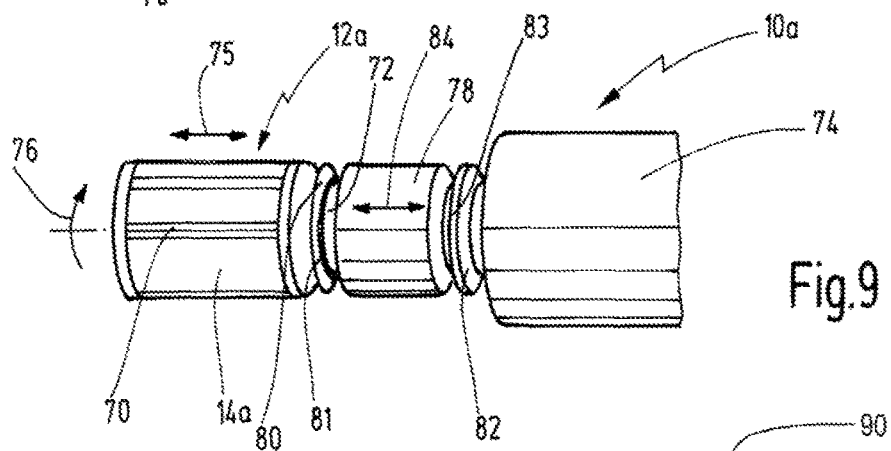
Fig.9
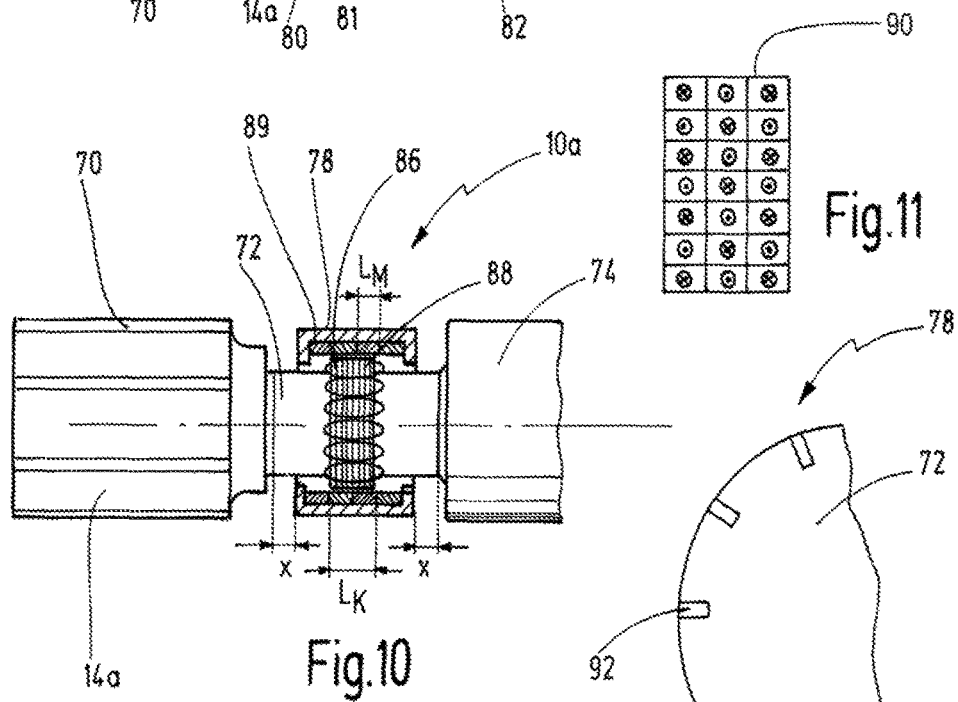
Fig.10
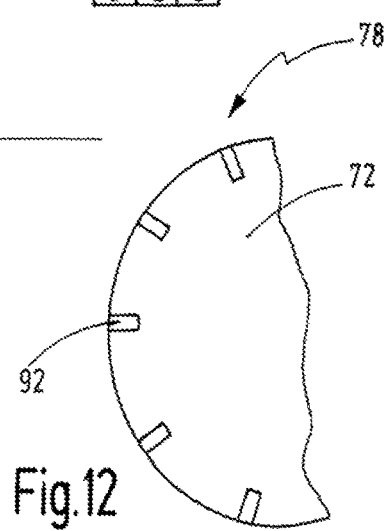
Fig.11
Fig.12

TOOL CLAMPING SYSTEM

CROSS-REFERENCES TO RELATED APPLICATIONS

This application is a divisional of U.S. Ser. No. 14/958,192, filed Dec. 3, 2015, which is a continuation of international patent application PCT/EP2014/057874, filed on Apr. 17, 2014 designating the U.S., which international patent application has been published in German language and claims priority from German patent application 10 2013 105 831.0, filed on Jun. 6, 2013. The entire contents of these applications are incorporated herein by reference.

BACKGROUND OF THE INVENTION

The invention relates to a tool clamping system having a mechanically drivable tool holder for clamping a tool.

Tool clamping systems of this type have been known for decades and are used in many ways when machining workpieces.

For some years, it has been required in some machining centers with rotating tools, in addition to the conventional cutting tools, to also provide for measurement-based applications or monitoring operations of the tool. These are generally applications in which a measurement system, usually based on electromechanical principles, is mounted on a spindle interface. On the one hand the connection and guidance is to be ensured by the machine kinematics, and on the other hand the sensing of the measured values and transfer thereof to the controller are to be made possible. Here, the energy supply of the measurement system must be provided usually by batteries or accumulators. The data transfer to a fixed evaluation station takes place as standard via infrared transmitters and receivers, and increasingly also via radio, such as WIFI or Bluetooth.

However, the supply by means of battery or accumulator is usually a limiting variable, since the assurance of the energy supply thus leads to additional maintenance and supervision effort. The charging station is normally located outside the machine tool, or the application in question must be removed from the machine tool in order to change the battery. In addition, the energy supply in the case of sensor systems or possibly also actively operating, actuator systems generally constitutes a limitation. As a result, and due to the extremely harsh environment in the working area of machine tools, the equipping of tools known per se with additional intelligence is not successful in principle.

On this basis, there is a need for tool monitoring systems that can operate with machine tools without external energy supply.

SUMMARY OF THE INVENTION

It is a first object of the invention to disclose a tool clamping system comprising a mechanically drivable tool holder for clamping a tool, which system allows an energy supply for generating electrical energy without an external voltage supply in the form of a battery or an accumulator.

It is a second object of the invention to disclose a tool clamping system which allows for generating electrical energy for driving a sensor configured for monitoring an operating parameter of the tool clamping system.

It is a third object of the invention to disclose a tool clamping system which allows for generating electrical energy to facilitate a wireless communication of a sensor signal from the tool or the tool holder to an external monitoring unit.

These and other objects are achieved according to one aspect of the invention by tool clamping system for clamping a tool, comprising:

a tool holder for holding a tool;
a rotary drive for driving said tool holder rotatingly about a longitudinal axis thereof;
an electromagnetic generator comprising a stator part being mounted on said tool holder and a rotor part being rotatably mounted on said stator part;
wherein said stator part and said rotor part cooperate as an electromagnetic generator configured for generating electrical energy from inertial energy of said rotor part relative to said stator part.

Since the tool clamping system is always moved with a certain inertia during operation, this inertial energy is utilized in accordance with the invention in order to generate electrical energy. This electrical energy can be used in the region of the tool or the tool clamping in order to supply a feedback via the tool or the tool clamping system during operation, such that the machining process can be better controlled and/or monitored.

The tool holder is driven in rotation and the device is configured for the generation of electrical energy from the inertial energy of the rotating tool clamping system.

Rotating tools do not, in principle, always have to be brought to operating rotational speed. Since manufacturing installations are designed to minimize nonproductive time, a rotational speed ramp is generally implemented at the limit of the electric spindle capability. This rotational speed acceleration can be used in order to recover electrical energy from the inertial energy of the rotating tool clamping system.

In accordance with a further embodiment of the invention the tool holder can be driven in an oscillating manner and the device is configured for the generation of electrical energy from the inertial energy of the oscillating tool clamping system.

Here, the oscillation may be in particular a longitudinal oscillation, i.e. a linear movement back and forth in the axial direction. However, a rotary oscillation is also conceivable in principle, i.e. an oscillating rotary movement back and forth about an axis of rotation. The oscillating movement may additionally also be superimposed by a rotational movement, of which the inertia likewise can be used for energy generation.

As already indicated above, the oscillation may be a longitudinal oscillation, i.e. the tool holder can be driven back and forth in an oscillating manner in the longitudinal direction. For this purpose, the device for generating electrical energy may have an inertial mass mounted axially movably on a shaft of the tool holder.

In this way a movement oscillating in the longitudinal direction can be utilized very easily for energy generation.

In accordance with a further embodiment of the invention the tool holder is designed to receive a honing tool.

Honing tools are generally driven in rotation on the one hand, and on the other hand the honing tool moves in a longitudinal movement oscillating back and forth, such as when a bore, for example a cylinder bore, is machined in a diesel engine or a petrol engine.

Since the honing tool during honing is itself changed as a result of workpiece removal, the honing tool must be tracked during the honing process. A force measurement or a path measurement would be advantageous for this purpose in order to allow an optimized tracking of the tool. The honing process can be improved further still when this is monitored continuously by a force or path measurement. In accordance with the invention the generated energy can be used in order to transfer the force or the position of the honing stones preferably wirelessly to a controller, by means of which the honing process can be monitored and controlled.

In accordance with a development of the invention the inertial mass is mounted axially movably between two preferably resilient stops.

A defined deflection in the axial direction is defined in this way.

Further, the tool clamping system, on the shaft and the inertial mass, may have at least one winding, which cooperates with a magnet for generation of an induction voltage from the movement oscillating back and forth in the longitudinal direction and/or the rotary movement.

In accordance with a further embodiment of the invention the at least one magnet, preferably in the form of a permanent magnet, cooperates on the one hand with at least one winding or a magnet array on the other hand, wherein the at least one magnet is preferably provided on the inertial mass and the at least one winding or the magnet array is preferably provided on the shaft.

A simple utilization of the generated voltage is thus made possible by tapping at the winding or the magnet array on the shaft.

In accordance with a further embodiment of the invention a maximum amplitude in the axial direction defined in the axial direction between the two stops is greater than the axial length of the at least one magnet.

An effective voltage generation is thus ensured.

In accordance with a further embodiment of the invention the at least one winding has a magnet core, of which the axial length deviates from the axial length of the at least one magnet.

A large magnetic detent moment is thus avoided and an axial movement of the inertial mass is facilitated.

As a result of these measures, a very effective energy recovery can be ensured.

In a further embodiment of the invention the device for generating electrical energy is designed as a voltage generator on the tool holder, comprising a rotor, which is rotatably mounted on the tool holder preferably by means of a rolling bearing, and comprising a stator part on the tool holder for voltage generation by electromagnetic induction.

A voltage can be generated in this way directly at the tool holder with relatively little additional effort. This voltage can be utilized for example in order to supply voltage to sensors for example and to evaluate signals thereof.

In accordance with a further feature of the invention the inertial mass is mounted magnetically, preferably by means of permanent magnets, or by means of a sliding or rolling bearing.

Particularly in the case of a magnetic mounting, a very precise, low-loss mounting is provided, for example on a shaft of the tool holder.

In an advantageous development of the invention the rotor has a pole system with permanent magnets, said pole system being assigned induction windings on the stator part.

A low-wear generator for voltage generation is thus provided directly on the stator part.

The voltage generator can be formed in an advantageous embodiment of the invention as a drum rotor with hollow-cylindrical structure or as a disk rotor.

Voltage generators designed as disk rotors are available as standard and can be integrated relatively easily in the tool holder below the shaft receptacle for the tool.

The induction windings may be connected for example as mono-phase or tri-phase voltage source. The mono-phase connection is preferred in respect of the conditioning effort for the generated voltage.

The output voltage of the stator part is preferably fed to a rectifier, more preferably a bridge rectifier.

The output voltage of the stator part is more preferably fed to a device for voltage stabilization, which has at least one capacitor and preferably a Zener diode.

With a capacitor, in particular what is known as a gold-cap capacitor, a good storage possibility for the generated energy is provided and is also sufficient over a longer period of time for supplying energy to consumers.

When the tool clamping system is run at nominal rotational speed, a resistance moment is produced, which leads to a slower equalization of the rotational speed of the rotor to the spindle rotational speed. Conversely, when the tool clamping system is braked, a delayed braking of the rotor is produced.

Depending on the power drain from the induction windings and the respective inertia of the rotor, there is a delayed adaptation of the rotational speed of the rotor to the spindle rotational speed. In an advantageous application-based design of the inertial moment of the rotor, of the windings and of the consumer or of the storage unit, in particular the capacitor, energy can be removed from the system according to the invention over a relatively long time in order to supply energy to a consumer, such as a sensor.

The output voltage of the voltage generator, which is preferably rectified and voltage-stabilized, can be fed for example to a sensor and/or a transmitter for the wireless transfer of a useful signal to a stationary evaluation circuit.

The sensor can be provided in order to monitor an operating parameter of the tool clamping system and to feed this to an evaluation circuit.

The operating parameter may be, for example, the temperature, the acceleration of the tool clamping system, the force exerted onto the tool, the position of the tool, or another operating parameter.

In a further advantageous embodiment of the invention the sensor is provided on the tool and is coupled to the tool holder via an electric interface for transferring a supply voltage and an output signal.

A transmitting device is more preferably provided for the wireless transfer of a signal to a stationary evaluation circuit, which is preferably arranged on the tool holder.

For the wireless transfer, any known methods can be used, such as radio transfer, RFID, Bluetooth, WIFI, etc.

The tool may be any tool, such as a drilling tool, milling tool, sawing tool or also a different tool or an extension.

A method for monitoring a machine tool is also disclosed in accordance with the invention, comprising a tool clamping system having a mechanically drivable tool holder for clamping a tool, with which electrical energy is generated from the inertial energy of the tool clamping system and is used to monitor the tool, in particular to monitor operating parameters selected from the group consisting of the temperature of the tool, the temperature of the coolant, the cutting integrity of the tool, the acceleration of the tool, the force transferred to the tool, and the position of the tool.

In a development of the method according to the invention the electrical energy is generated from a rotary movement of the tool or from a linear movement of the tool relative to a tool holder.

It goes without saying that the features mentioned above and the features yet to be explained hereinafter can be used not only in the specified combinations, but also independently, without departing from the scope of the invention.

BRIEF DESCRIPTION OF THE DRAWINGS

Further features and advantages of the invention will emerge from the following description of preferred exemplary embodiments with reference to the drawing, in which:

FIG. 8 shows a perspective illustration of a conventional honing tool with drive shaft;

FIG. 9 shows a perspective illustration of a tool clamping system according to the invention with a honing tool;

FIG. 10 shows a partially sectional longitudinal view of the tool clamping system according to FIG. 9, from which the structure of the inertial mass with magnet array becomes clearer;

FIG. 11 shows a schematic illustration of the magnet array according to FIG. 10, and FIG. 12 shows an enlarged partial view of the magnet array according to FIG. 10 with permanent magnet for mounting.

DESCRIPTION OF PREFERRED EMBODIMENTS

Figure 1:
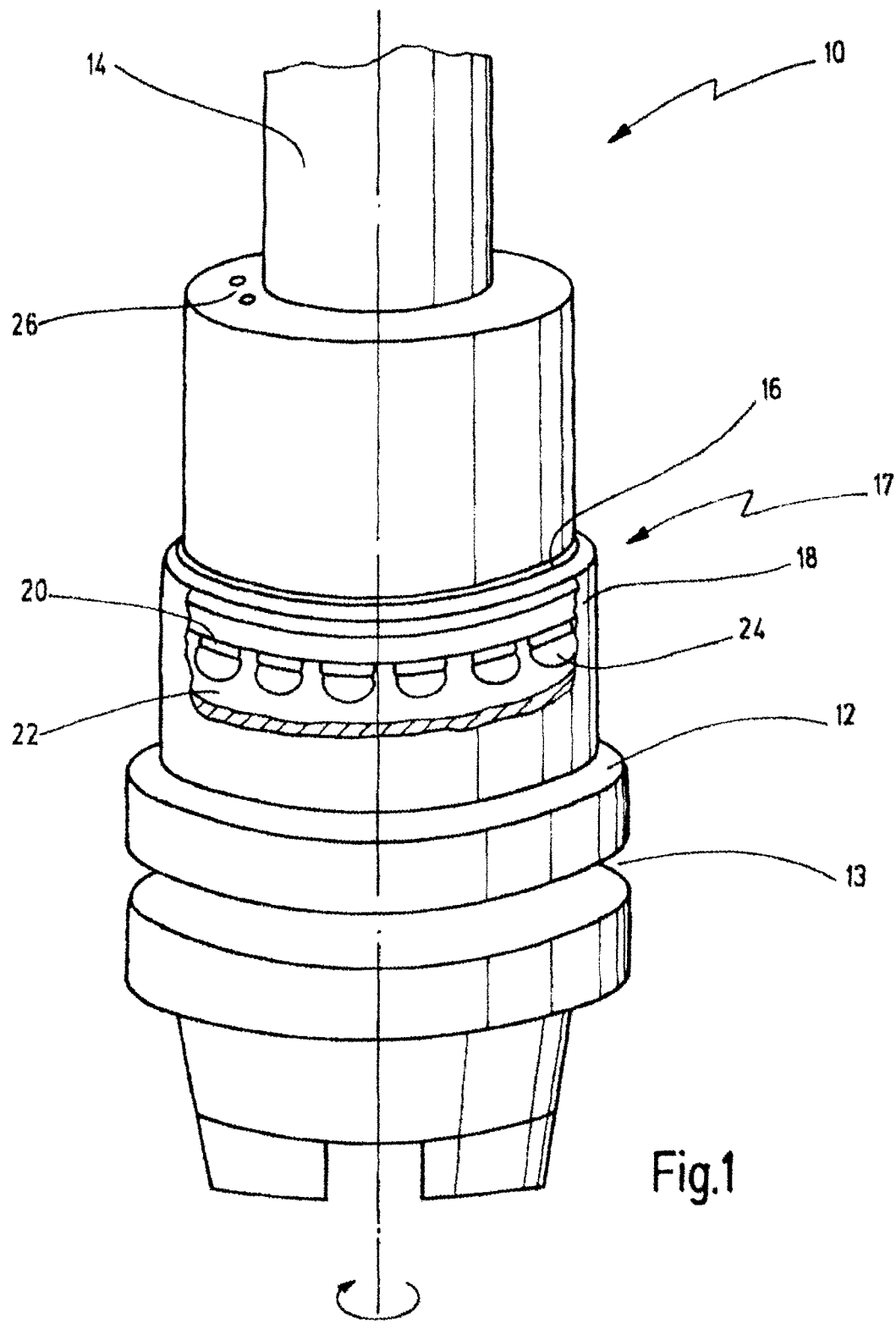
FIG. 1 shows a perspective view, exposed in part, of a tool clamping system according to the invention.

A simplified embodiment of a tool clamping system according to the invention is illustrated prospectively in FIG. 1 and is designated on the whole by numeral 10.

The tool clamping system 10 has a tool holder 12 in the form of an HSK, which can be driven in rotation by a tool spindle, for example of a lathe or miller. The tool holder 12 can be formed for example as a shrink chuck or also as a mechanically clampable chuck.

A voltage generator designated on the whole by 17 is received above a changeover receptacle 13 on the side facing toward the tool 14. In the illustrated case the voltage generator 17 has an inner part or stator part 22 received on the tool holder 12, on which inner part or stator part induction windings 24 are provided. The stator part 22 cooperates with an outer part in the form of a rotor 18 mounted on said stator part by means of a rolling bearing 16, there being permanent magnets 20 provided on the rotor.

The rotor 18 with the permanent magnets 20 is thus rotatably mounted on the stator part 22.

If the tool clamping system 10 is accelerated by a tool spindle, a relative movement between the rotor 18 and the stator part 22 is thus produced as a result of the inertia of the rotor 18. By means of the movement of the permanent magnets 20 along the induction windings 24, a voltage is induced in the induction windings 24 on account of the electromagnetic induction.

The induced AC voltage can be rectified and stored by means of a capacitor and stabilized by means of a stabilization element, such as a Zener diode.

For example, this voltage can be supplied to a sensor, which is received in the tool 14, for which purpose a suitable electric interface 26 is arranged at the outer end of the tool holder 12 in order to ensure the electrical contact with the sensor for voltage supply thereof and for the transfer of an output signal.

Figure 2:
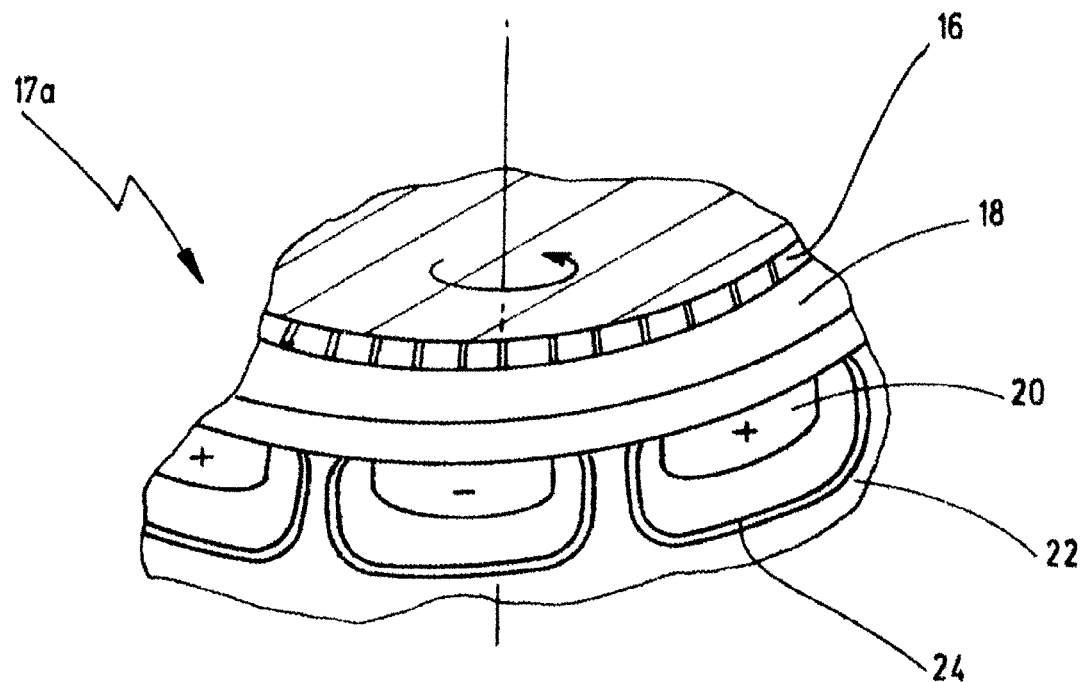
FIG. 2 shows a simplified detail of a voltage generator according to the invention in an embodiment as disk rotor.

In FIG. 2 a detail of a voltage generator designated on the whole by 17a is illustrated and is designed as a disk rotor. Here, the permanent magnets 20 in question are arranged in a planar manner in a plane of the disc-shaped rotor 18 and cooperate with the induction windings 24, which are arranged in a planar manner in the direct vicinity of the permanent magnets 20, likewise in a plane of the stator part 22.

The permanent magnets 20 are arranged alternately with reversed polarity. In the event of a rotation of the rotor 18 relative to the stator part 22, and approximately sinusoidal induction voltage is produced in the induction windings 24 of the stator part 22. The induction windings 24 may be connected for example in a mono-polar or multi-polar (in particular tri-polar) manner. A mono-polar connection is preferably used, which results in a reduced conditioning effort with the subsequent stabilization of the voltage.

Figure 3:
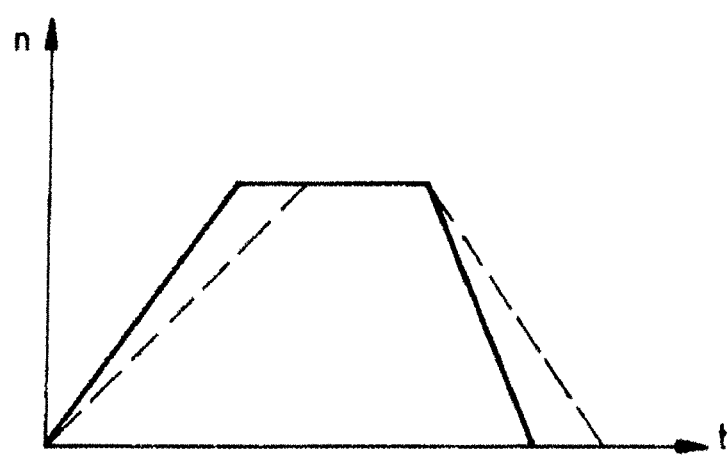
FIG. 3 schematically shows a profile of the rotational speed of the tool clamping system depending on time, with delayed profile of the rotor indicated in a dashed manner.

In FIG. 3 a rotational speed ramp is plotted over time by way of example and shows the start-up of the tool clamping system 10 to a determined operating rotational speed, followed by a temporary maintenance of the rotational speed and a subsequent braking of the rotational speed to 0. Offset in relation thereto, there is shown in a dashed manner the rotational speed set at the rotor 18 by the delay.

Of course, the rotor 18 is delayed compared with the tool holder 12, which results on the one hand by the inertia of the rotor 18, but on the other hand also by the induced voltage, which under load leads to an electromotive force, which is directed opposite the cause, as is known.

With a mono-phase connection of the induction windings 24, an approximately sinusoidal induction voltage is produced, which naturally becomes increasingly smaller over time with equalization of the rotational speeds between the rotor 18 and the tool holder 12.

Figure 4:
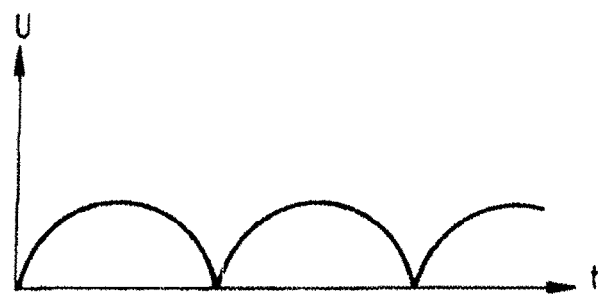
FIG. 4 shows a schematic illustration of the AC voltage generated by the voltage generator following rectification by a bridge rectifier.

FIG. 4 shows the induced voltage following rectification by a bridge rectifier, again in the starting phase (i.e. without considerable reduction of the voltage).

Figure 5:
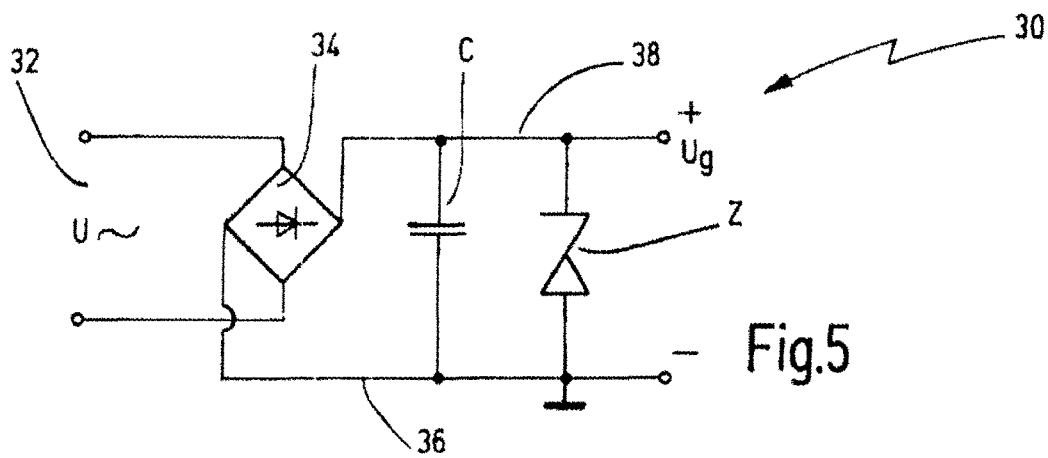
FIG. 5 shows a possible circuit for rectification and voltage stabilization of the AC voltage generated by the voltage generator.

FIG. 5 shows an exemplary circuit 30, which can be used for storage and voltage stabilization. The output voltage 32 of the voltage generator 17 or 17a is fed to the input of a bridge rectifier 34. A capacitor C and parallel thereto a Zener diode Z are disposed between the two outputs 36, 38 of the bridge rectifier 34, wherein the Zener diode may additionally also be disposed in series with a resistor (not illustrated).

The capacitor C is preferably embodied as a gold-cap capacitor, which ensures a particularly high capacitance with particularly low losses and thus enables a long-term storage. Depending on the output voltage peaks of the windings, it may be necessary to adapt this voltage under the breakdown voltage of the storage capacitor. The Zener diode limits the output voltage $U_g$ to a value defined by the Zener diode. The output voltage $U_g$ is available as useful voltage, with the aid of which any electronic components can be supplied, wherein these may preferably be constituted by a sensor, a circuit for signal processing, or for example a transmitter.

It goes without saying that the components illustrated here are merely purely exemplary in nature and that, instead of the analogue circuit components presented here, digital circuit components are of course also conceivable, as long as the provided energy is sufficient for voltage supply.

Figure 6:
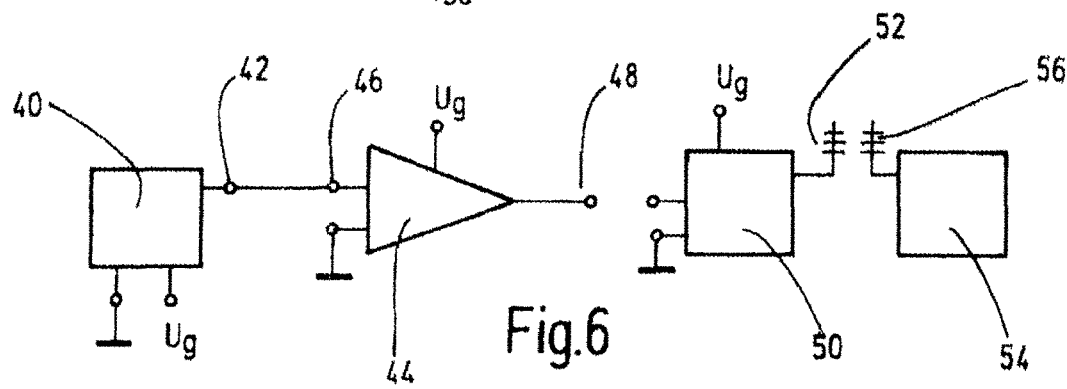
FIG. 6 shows a schematic illustration of a sensor that is supplied by the generated, rectified and voltage-stabilized supply voltage $U_g$ in order to operate, with the output signal thereof, an operational amplifier, which in turn operates a transmitter for the wireless transfer of the useful signal to a stationary evaluation circuit.

In FIG. 6 a sensor 40 is illustrated by way of example, which sensor is fed by the generated supply voltage $U_g$ and provides at its output 42 an output signal.

The sensor may be, for example, a temperature sensor, an acceleration sensor or a force sensor (for example DMS measuring bridge). The sensor 40 may be used to monitor any operating parameters of the tool clamping system, i.e. for example for temperature monitoring, for force monitoring, for monitoring the acceleration.

According to FIG. 6 the output signal of the sensor 40 is fed to the input 46 of a downstream operational amplifier 44, which is likewise supplied by the supply voltage $U_g$. The amplified signal is available at the output 48 of the operational amplifier 44 and can then be fed, where necessary after further processing, to a transmitter 50, which transfers the signal via an antenna 52 wirelessly to a stationary evaluation circuit 54, which in turn has a suitable antenna 56.

It goes without saying that any known methods can be used for signal processing. Such methods are known and can of course be used within the scope of the present invention.

Figure 7:
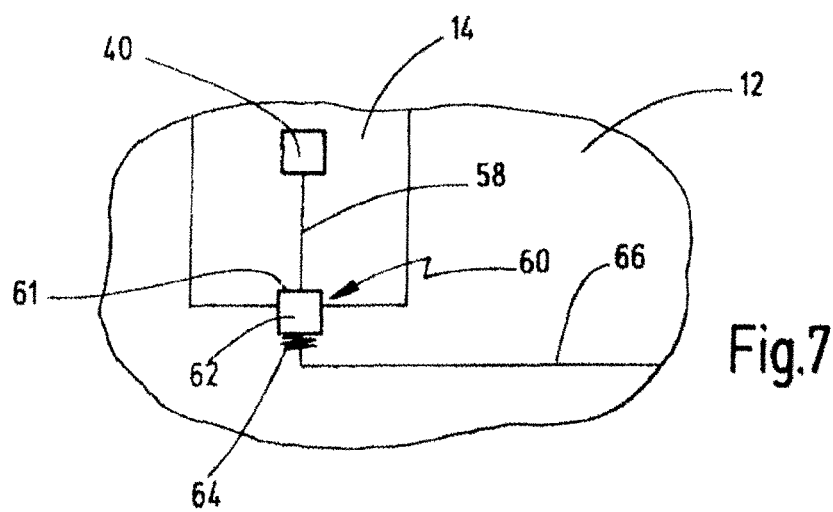
FIG. 7 shows a simplified schematic illustration of an electric interface at the end of the tool shaft.

FIG. 7 shows by way of example the arrangement of an electric interface 60 in the region between the shaft end of the tool 14 and a receiving bore of the tool holder, which is formed here for example as a shrink holder.

At the end of the tool shaft of the tool 14, a contact face 61 is provided on the end face and is electrically insulated from the rest of the tool 14, for example by means of suitable ceramic layers, and is coupled via a line 58 for example to an associated sensor 40 in the tool 14. The contact face 61 is assigned a resiliently mounted contact pin 62 on the tool holder 12, which contact pin is pre-loaded toward the tool 14 via a spring 64. This contact pin 62 is also electrically insulated in a suitable manner with respect to the rest of the material of the tool holder 12 and is connected for example via a line 66 to an associated evaluation and transmitting unit within the tool holder 12.

Here, merely one arrangement for transfer is shown by way of example for merely one pole. It goes without saying that of course further contacts can be provided for the other poles (for example for the voltage supply of the sensor 40), possibly in a concentric arrangement. A concentric arrangement has the advantage that a voltage transfer is enabled independently of the position of installation of the tool 14 on the tool receptacle 12.

Depending on the application in question for which the present voltage generator is to be used, the inertial moment of the rotor, the windings and the consumer in question and also the associated circuit for storage and voltage stabilization are advantageously coordinated with one another in a suitable manner in order to attain an optimal voltage yield for the application in question, the voltage yield being sufficient over a long period of time for sufficiently supplying energy to the desired monitoring circuit(s) in a suitable manner.

An alternative embodiment of the invention will now be explained with reference to the following FIGS. 8 to 12, in which the oscillation energy in the case of a honing tool is used for energy generation.

FIG. 8 shows a conventional tool clamping system 10' for a honing tool 14'. The honing tool 14' is received on a shaft 72, which is driven by a tool spindle 74. The honing tool 14' has a plurality of honing stones 70, which are received on the outer surface of the tool holder 12'. The shaft 72 is driven in rotation, as is indicated by the arrow 76. In addition, the shaft 72 is driven with longitudinal oscillation in the axial direction, as is indicated by the arrow 75.

By means of a wedge-shaped mounting of the honing stones 70 on the tool holder 12', only a slightly grinding movement without substantial workpiece removal is produced in a first direction of the honing tool 14', whereas, in the reverse direction, on account of the wedge effect, the honing stones 70 bear under pressure against the inner surface of the workpiece to be honed (for example a cylinder bore of an internal combustion engine) and cause a workpiece removal. The honing stones during the course of the honing process receive, in part, removed material of the workpiece, such that an axial adjustment of the tool holder 12' on the shaft is necessary in order to ensure a uniform machining (not illustrated). In the case of conventional honing machines this readjustment is made empirically on the basis of the number of performed strokes of the honing tool 14'.

FIG. 9 now shows a tool clamping system 10a for a honing machine that is constructed in accordance with the invention and has a device 78, 88, 90 for voltage generation from the inertial energy of an oscillating honing tool 14a. A sensor can be operated with this energy, which sensor either detects the position of the honing tool 14a or the force exerted onto the honing tool and transfers this wirelessly, for example via WIFI, to a controller of the honing machine.

An inertial mass 78 having a magnet array 90 is mounted movably in the axial direction, as indicated by the arrow 84, on the shaft 72 of the tool clamping system 10a, which is driven by the spindle 10a (or a suitable interface). The inertial mass is movable back and forth between two stops 80, 82, wherein the movement energy is stored by springs 81, 83 located therebetween. If the honing tool 14a is moved back and forth in an oscillating manner in the direction of the arrow 75, the inertial mass 78 thus moves back and forth in the direction of the arrow 84 with a certain phase shift relative to the movement of the honing tool 14a.

By means of a winding 88 on a magnet core 86 in the form of a laminated core according to FIG. 10, a voltage is induced hereby in cooperation with associated permanent magnets 89 on the inertial mass 78 in accordance with the principle of a linear generator. This voltage can be used to operate a sensor and for the wireless transfer of a signal in order to capture and to transfer the absolute position of the honing tool 14a or the force exerted onto the honing stones 70.

The axial length $L_M$ of the permanent magnets 89 is much shorter than the axial length of the magnet core $L_K$ 86 of the winding 88. An effective voltage generation is thus ensured.

In order to prevent the production of a large magnetic detent moment as a result of matching axial lengths ($L_M$) of the permanent magnets 89 and of the magnet core ($L_K$) of the winding 88, the axial length ($L_M$) of the permanent magnets deviates slightly from the axial length of the magnet core 86 ($L_M \neq L_K$).

It goes without saying that, instead of one winding 88 with a magnet core 86, a plurality of windings 88 may also be provided on the shaft 72 distanced axially from one another.

FIG. 11 shows, by way of example, a magnet array 90, which can be received on the shaft 72 alternatively to the winding 88 in order to ensure a particularly effective energy generation. The magnet array 90 is illustrated in a planar arrangement of the different windings extending in the radial direction. With a magnet array 90 of this type, an effective energy generation can be ensured both from the alternating linear movement of the honing tool 14a and from the rotation energy of the inertial mass 78.

FIG. 12 shows, by way of example, how permanent magnets 92 provided in the outer periphery of the shaft 72 can be used for the low-loss magnetic mounting of the inertial mass 78 on the shaft 72.

The invention claimed is:

1. A tool clamping system for clamping a tool, comprising:
   a tool holder for holding a tool;
   a drive for driving said tool holder oscillatingly;
   an electromagnetic generator configured for generating electrical energy from an inertial energy of said oscillating drive; and
   a sensor configured for monitoring an operating parameter of the tool clamping system;
   wherein said sensor is powered by the electrical energy generated by said electromagnetic generator.

2. The tool clamping system of claim 1, wherein said drive is configured for driving said tool holder back and forth in a longitudinal direction.

3. The tool clamping system of claim 2, further comprising an inertial mass being mounted axially movably on a shaft of said tool holder.

4. The tool clamping system of claim 3, wherein said tool holder is configured for receiving a honing tool.

5. The tool clamping system of claim 4, wherein said inertial mass is mounted axially movably between two stops.

6. The tool clamping system of claim 3, wherein, on said shaft and said inertial mass, there is provided at least one winding cooperating with a magnet for generating an induction voltage from said oscillating movement.

7. The tool camping system of claim 6, further comprising at least one permanent magnet arranged on said inertial mass cooperating with said at least one winding, wherein said at least one winding is arranged on said shaft.

8. The tool camping system of claim 7, wherein said at least one winding is part of a magnet array.

9. A tool clamping system for clamping a tool, comprising:
   a tool holder for holding a tool;
   a drive for driving said tool holder oscillatingly;
   an electromagnetic generator for generating electrical energy from an inertial energy of said tool clamping system; and
   an inertial mass being mounted movably on a shaft of said tool holder;
   wherein, on said shaft and said inertial mass, there is provided at least one winding cooperating with a magnet for generating an induction voltage from said inertial energy of said oscillating movement;
   wherein said drive is further configured for rotatingly driving said tool, and wherein said at least one winding cooperating with said magnet is further configured for generating an induction voltage from said rotating movement.

10. A tool clamping system for clamping a tool, comprising:
    a tool holder for holding a tool;
    a drive for driving said tool holder oscillatingly;
    an electromagnetic generator for generating electrical energy from an inertial energy of said tool clamping system;
    an inertial mass being mounted movably on a shaft of said tool holder;
    at least one winding arranged on said shaft and said inertial mass and cooperating with a magnet for generating an induction voltage from said oscillating movement; and
    at least one permanent magnet arranged on said inertial mass cooperating with said at least one winding;
    wherein said inertial mass is mounted movably in an axial direction between two stops, wherein a maximum amplitude defined in said axial direction between said two stops is greater than an axial length of said at least one permanent magnet.

11. The tool clamping system of claim 10, wherein said at least one winding comprises a magnet core having an axial length deviating from an axial length of said at least one permanent magnet.

12. A tool clamping system for clamping a tool, comprising:
    a tool holder for holding a tool;
    a drive for driving said tool holder oscillatingly;
    an electromagnetic generator configured for generating electrical energy from an inertial energy of said oscillating drive;
    a sensor configured for monitoring an operating parameter of the tool clamping system; and
    a transmitter configured for transmitting an output signal generated by said sensor to an evaluation circuit;
    wherein said sensor and said transmitter are powered by the electrical energy generated by said electromagnetic generator.

13. The tool clamping system of claim 12, further comprising an antenna fed by said transmitter for transmitting said output signal of said sensor wirelessly.

14. The tool clamping system of claim 12, wherein said evaluation circuit is configured as a stationary evaluation circuit.

* * * * *